US009122792B2

(12) United States Patent
Bates et al.

(10) Patent No.: US 9,122,792 B2
(45) Date of Patent: Sep. 1, 2015

(54) STEP OVER OPERATION FOR MACHINE CODE FUNCTION CALLS

(71) Applicant: International Business Machines Corporation, Armonk, NY (US)

(72) Inventors: Cary L. Bates, Rochester, MN (US); XiaoLing Chen, Beijing (CN); Wang Fan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/896,422

(22) Filed: May 17, 2013

(65) Prior Publication Data

US 2014/0344789 A1 Nov. 20, 2014

(51) Int. Cl.
*G06F 9/44* (2006.01)
*G06F 11/36* (2006.01)

(52) U.S. Cl.
CPC .......... *G06F 11/362* (2013.01); *G06F 11/3624* (2013.01); *G06F 11/3636* (2013.01)

(58) Field of Classification Search
CPC G06F 11/362; G06F 11/3624; G06F 11/3636
See application file for complete search history.

(56) References Cited

U.S. PATENT DOCUMENTS 4,819,234 A 4/1989 Huber
5,371,747 A * 12/1994 Brooks et al. ................ 714/38.1
6,091,896 A 7/2000 Curreri et al.
6,249,907 B1 * 6/2001 Carter et al. .................. 717/129
6,862,694 B1 * 3/2005 Tormey et al. .................. 714/34
8,286,142 B2 10/2012 Fjeldstad et al.
8,312,435 B2 * 11/2012 Wygodny et al. ............. 717/130
8,910,124 B1 * 12/2014 Bhansali et al. .............. 717/128
2003/0149961 A1 * 8/2003 Kawai et al. .................. 717/129
2005/0273757 A1 * 12/2005 Anderson ..................... 717/100
2006/0041867 A1 * 2/2006 Bates et al. ................... 717/129
2007/0033577 A1 * 2/2007 Arackal ........................ 717/124
2007/0074168 A1 * 3/2007 Bates et al. ................... 717/124
2012/0110553 A1 * 5/2012 Bates et al. ................... 717/129
2012/0110554 A1 * 5/2012 Bates et al. ................... 717/129
2012/0110555 A1 * 5/2012 Bates et al. ................... 717/129
2012/0246624 A1 * 9/2012 Halliday et al. .............. 717/129

(Continued)

OTHER PUBLICATIONS

Plambeck, K.E.; Eckert, W.; Rogers, R.R.; Webb, C.F., Development and attributes of z/Architecture, [Online] 2002, IBM Journal of Research and Development , vol. 46, No. 4.5, pp. 367,379, Jul. 2002 [Retrieved from the Internet] <http://ieeexplore.ieee.org/stamp/stamp.jsp?tp=&arnumber=5389016&isnumber=5389003>.*

(Continued)

*Primary Examiner* — Thuy Dao
*Assistant Examiner* — Ravi K Sinha
(74) *Attorney, Agent, or Firm* — Richard A. Wilhelm; James R. Nock

(57) ABSTRACT

A method for implementing a step over operation by a debugger for an instruction in a routine includes receiving a step over command for an instruction and determining whether the instruction is a branch used for a function call. If the instruction is not a branch used for a function call, then the debugger treats the instruction as not a function call. If the instruction is a branch used for a function call, then the debugger determines whether the instruction is generated from source code. If the instruction is not generated from source code, then the debugger treats the instruction as not a function call. If the instruction is generated from source code, then the debugger treats the instruction as a function call.

8 Claims, 5 Drawing Sheets

(56) References Cited

U.S. PATENT DOCUMENTS

| | | | | |
|---|---|---|---|---|
| 2012/0297370 | A1* | 11/2012 | Sale et al. | 717/128 |
| 2012/0317552 | A1 | 12/2012 | Bates | |
| 2013/0117732 | A1* | 5/2013 | Zoller et al. | 717/129 |
| 2013/0263094 | A1* | 10/2013 | Bates et al. | 717/129 |

OTHER PUBLICATIONS

DWARF Debbuging Information Format, Version 4, [Online] Jun. 10, 2010, Copyright 2010 DWARF Debugging Information Format Committee, [Retrieved from the Internet] <http://www.dwarfstd.org/doc/DWARF4.pdf> 325 pages.*

Wikipedia page entry for dbx(debugger), [Retrieved from the Internet on Dec. 4, 2014] <http://en.wikipedia.org/wiki/Dbx_(debugger)> 2 pages.*

Phil Winterbottom, ACID: A Debugger Built From A Language, [Online] 1994, USENIX Winter, Jan. 17-21 San Francisco CA, [Retrieved from the Internet] <http://static.usenix.org/publications/library/proceedings/sf94/full_papers/winterbottom.pdf> pp. 211-222.*

Henry Lieberman, Steps toward better debugging tools for LISP, [Online] 1984, In Proceedings of the 1984 ACM Symposium on LISP and functional programming (LFP '84). ACM, New York, NY, USA, [Retrieved from the Internet] <http://doi.acm.org/10.1145/800055.802041 > p. 247-255.*

Kumar et al., Tdb: a source-level debugger for dynamically translated programs, [Online] 2005, In Proceedings of the sixth international symposium on Automated analysis-driven debugging (AADEBUG'05). ACM, New York, NY, USA, [Retrieved from the Internet] <http://doi.acm.org/10.1145/1085130.1085147 > pp. 123-132.*

Boothe, B., "Efficient Algorithms for Bidirectional Debugging," PLDI '00 Proceedings of the ACM SIGPLAN 2000 Conference on Programming Language Design and Implementation, pp. 299-310, ©ACM 2000, New York, NY, US. DOI: 10.1145/349299.349339.

Cornelissen, B., "Using Tide to Debug ASF+SDF on Multiple Levels," Master's Thesis Computer Science, Universiteit van Amsterdam, Dec. 2004, pp. 1-51.

* cited by examiner

```
int add2(int a, int b)
{
        int c
        c = a + b
        return c
}
        x = add2(1, 2)
```

Source Code

FIG. 1A

| Instruction | | Source Line | Action | |
|---|---|---|---|---|
| pushl | %eax | - | | Save register |
| pushl | $2 | 7 | | Push second integer on stack |
| pushl | $1 | 7 | | Push first integer on stack |
| pushl | %eip | - | Call | Push return address on stack |
| jmp | add2 | ← 101  7 | | Branch to function |
| pushl | %ebp | - | | Store base pointer |
| movl | %esp, %ebp | - | Prolog | Change base pointer to stack |
| subl | $4, %esp | - | | Allocate space for result |
| movl | 8(%ebp), %eax | 4 | | Load first integer (1) |
| addl | 12(%ebp), %eax | 4 | | Add second integer (2) |
| movl | %eax, -4(%ebp) | 3 | | Access result |
| movl | -4(%ebp), %eax | 5 | | Copy result to register |
| movl | %ebp, %esp | - | | Restore stack pointer |
| popl | %ebp | - | | Restore base pointer |
| popl | %eip | - | Epilog | Restore return address |
| jmp | %eip | ← 102  - | | Branch to return address |
| addl | $8, %esp | ← 103  - | | Remove parameters |
| movl | %eax, %reg | - | | Store result in register |

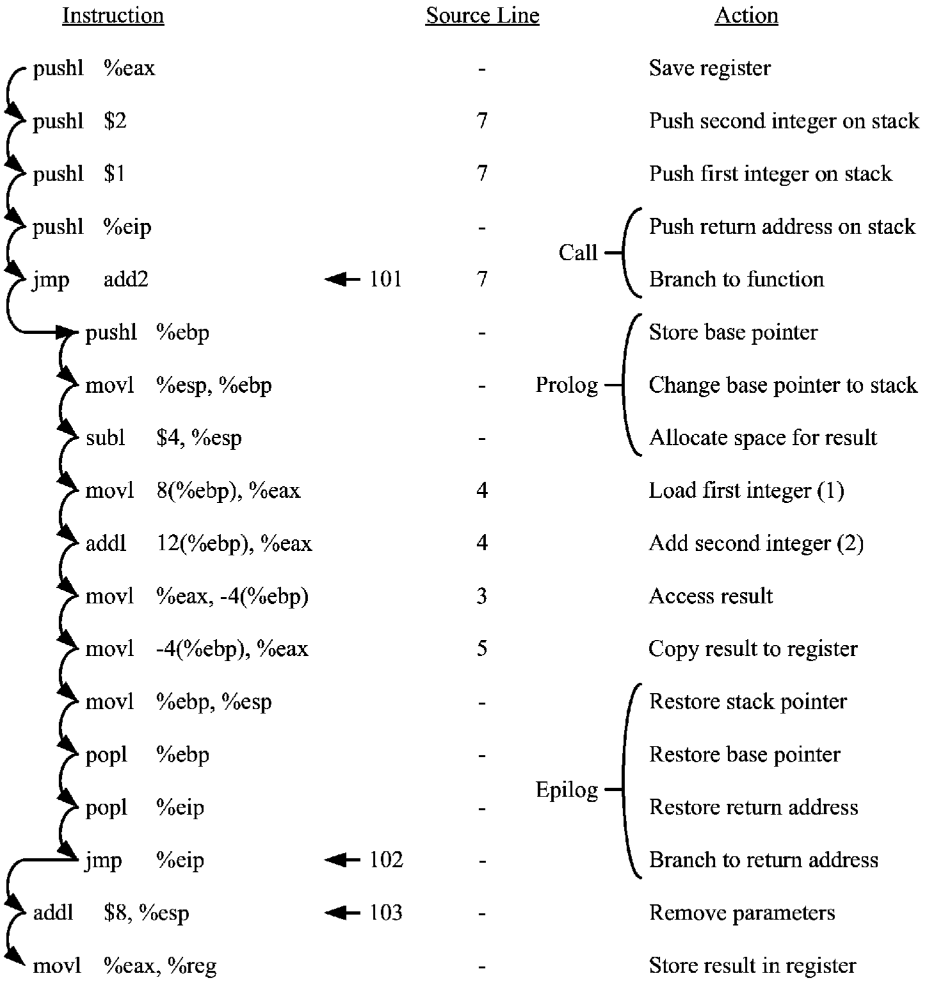

FIG. 1B

STEP OVER OPERATION FOR MACHINE CODE FUNCTION CALLS

This disclosure relates to debugger operations. In particular, it relates to a debugger step function at the machine code level.

BACKGROUND

A function, also known as a procedure, routine, or subroutine, is a sequence of instructions that perform a specific operation. Functions may be used to simplify a program by breaking parts of the program into simple steps and eliminating redundancy in codes. A calling routine gives control of the program to the function, passes variables into the function, and receives a result from the function. To call a function, the calling routine may contain a collection of instructions that branch to the function and specify the return address back into the calling routine after the function has executed.

SUMMARY

A method for implementing a step over operation by a debugger for an instruction in a routine includes receiving a step over command for an instruction and determining whether the instruction is a branch used for a function call. If the instruction is not a branch used for a function call, then the debugger treats the instruction as not a function call. If the instruction is a branch used for a function call, then the debugger determines whether the instruction is generated from source code. If the instruction is not generated from source code, then the debugger treats the instruction as not a function call. If the instruction is generated from source code, then the debugger treats the instruction as a function call.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 1A is an example of a function and function call written in source code.

FIG. 1B is an example of instructions and their corresponding line of source code and explanation.

DETAILED DESCRIPTION

Figure 2:
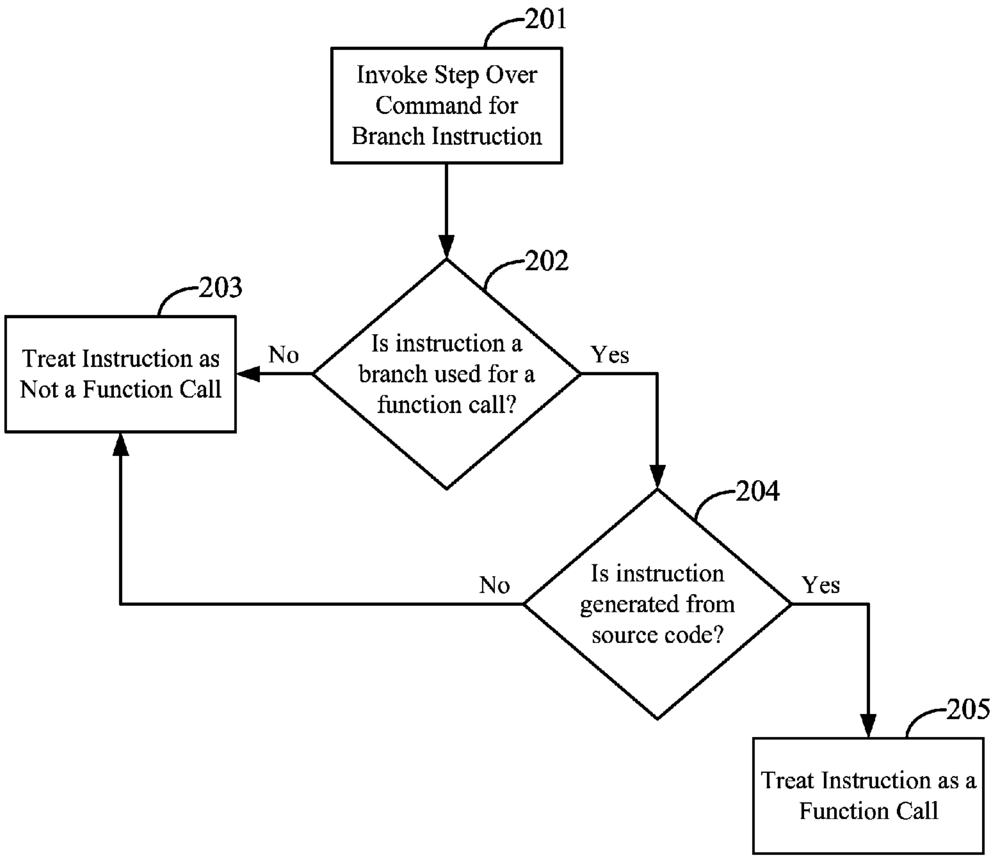
FIG. 2 is a flowchart of a method to evaluate a branch instruction during a step over operation, according to embodiments of the invention.

When source code created by a user calls a function, a compiler translates the function call into machine code according to a linkage (or call) convention. The linkage convention includes instructions for the function call of the calling routine, the prolog of the function, and the epilog of the function. The function call of the calling routine may include setting up the function, defining parameters and storage addresses, and branching to the function. The prolog of the function may include setting up the stack frame, storing the current register values in a save area, and preparing registers for the function's operations. The stack frame for the function contains information relating to the function, such as parameters, variables, and the program's return address. The body of the function contains the instructions of the function and corresponds to source code. The epilog of the function may include saving the result of the function, taking down the call stack frame, restoring the registers to their previous state before the function was called, and branching to the return address of the calling routine.

FIG. 1 is an example of a function call and return for IA-32 architecture. FIG. 1A is a piece of source code for a simple addition operation that includes a function for adding to numbers and a function call for adding a "1" and a "2". FIG. 1B is a chart of the machine instructions that are generated by a compiler for the source code (instruction column), the corresponding line of source code, if any (source line column), and the corresponding purpose of the machine instruction (action column). A compiler generates machine code, represented here by assembly code, from user-generated source code. Some machine instructions, namely those that regard the function's substantive operations, are generated directly from source code, as seen from the corresponding lines of source code. Other machine instructions, namely those that regard the function's structure, are generated from the architecture's linkage conventions.

Debuggers for software programs allow a user to evaluate code in the program by setting a breakpoint in the program, executing one or more instructions up to the breakpoint, and analyzing register values and the program's instruction stacks. To simplify its operations and user interface, a debugger will commonly have step commands to navigate through lines of source and machine code in a program. These step commands allow a user to execute the program instruction by instruction (machine code) or statement by statement (source code).

A debugger may have different step commands for navigating a called function within a routine. If a user is interested in evaluating the instructions of the called function, the user can "step into" the function using a "step into" command. For a "step into" operation, the debugger may set a breakpoint on the next instruction of the calling routine as well as the first instruction of the called function. The user may then walk through each instruction of the called function, eventually returning from the function and stopping at the breakpoint. If the user is not interested in the called function's operation or is only interested in the values returned by the function, the user can "step over" the function. For a "step over" operation, the debugger may only set a breakpoint on the next instruction of the calling routine and the called function will execute in its entirety through to the breakpoint without stopping in the function. In this way a user can more efficiently debug a program using the debugger's interface.

Debuggers may perform step commands on the source code or on the machine code. For example, the dbx debugger may evaluate source code with a "step" command that steps into a called function and a "next" command that steps over the called function, as well as other step commands for stepping out of a function once in the called function. Similarly, dbx may evaluate machine code with a "stepi" command that steps into a called function and a "nexti" command that steps over a called function.

At the source code level, when a debugger performs a "step over" command on a statement, the debugger evaluates whether the statement is a call to a function. The debugger may evaluate the statement in its entirety, which may include multiple machine instructions generated by a compiler according to a specific linkage convention. A debugger that is aware of the way in which the compiler generates machine code from source code may make assumptions about the source statement's character to determine whether the statement is a function call. For example, in a call convention of an IA-32 architecture utilizing a call stack, a call to a function involves pushing a return address for the program's instruction pointer onto the call stack and jumping to the function. In this linkage convention context, a debugger is able to determine whether the source statement is a function call. Other debuggers may rely on the depth of the call stack for assurance that execution has entered a subroutine when stepping a source line. If a step over command is given, these debuggers simply execute the program until the stack depth is equal to where it started.

At the machine code level, a debugger may not have the same context for identifying whether a machine instruction is a function call as the debugger may when evaluating source code. A debugger will likely not be able to detect a change in the stack depth after executing the jump instruction associated with the call. As illustrated in FIG. 1, more than one instruction may be used to call and return from a function, and some of these instructions may be generated according to the front-end and back-end characteristics of a compiler. When the debugger encounters a single instruction, it may not have the context from linkage conventions to determine whether the instruction is a branch used to call a function. For example, for the dbx debugger's "nexti" (machine level step over) operation to determine whether a branch instruction is a function call, dbx looks up the machine instruction in a table of instructions used for function calls. If the instruction is found in the table, the debugger will assume the instruction is a function call and set a breakpoint at the next instruction in the routine; otherwise, the debugger will set a breakpoint at the next instruction and at the branch target instruction. This may create control problems, as not all branch instructions used for function calls are exclusively used for that purpose.

Referring to FIG. 1, a user may perform a step over operation on the first jump instruction 101 (jmp add2). This jump instruction may be in a call table, as it is used for functions calls, so the debugger may determine the instruction to be a function call and set a breakpoint on the next instruction 103 (add1 $8, % esp). However, this jump instruction may be used for purposes other than calling a function, such as returning to the calling routine from a function. A user may already be in the function and may perform a step over operation at the second jump instruction 102 (jmp % eip). This second jump instruction, like the first jump instruction, may be present in the call table, so the debugger may determine the instruction to be a function call and only set a breakpoint on the next instruction, instead of setting a breakpoint at the target return instruction. The program may lose control and execute through the entirety of the program or until a breakpoint is encountered.

Additional problems may occur when stepping over recursive routines, as the return point may be encountered many times before the actual return from the instance of the routine being stepped over occurs. This requires that the stack depth be checked to know when the actual stepped over instance of the routine completes. On many systems, such as IBM's zSeries, the stack depth is established in the prolog and epilog. If the user is machine stepping through the epilog or prolog and tries to do a step over operation on a branch that looks like a call, the stack depth is not realizable and can lead to unpredictable behavior. The inability to use stack depth information for machine step operations leads to awkward support for recursive routines.

Step Over Operation

According to embodiments of the invention, a debugger may selectively perform a step over operation on an instruction by evaluating the instruction in the context of its source. As discussed above, a machine instruction has less information than a source statement for the debugger regarding whether the instruction is a function call. However, a debugger is able to make more assumptions about machine code generated by a compiler from source code than machine code that is not generated by a compiler from source code. A branch instruction for a function call may be generated directly from source code while other parts of the code, such as the prolog and epilog of a function, are generated from the linkage convention for the instruction set. A compiler may generate debug information regarding the source of the machine instructions, so that a debugger may determine whether a machine instruction has been generated from source code.

When a step over command is invoked for a branch instruction, the debugger may evaluate whether the branch instruction can be used for a function call. If the instruction can be used for a function call, the debugger evaluates whether the branch instruction is generated from source code. If the instruction is not generated from source code, the debugger cannot be sure that the branch instruction will be used for a function call. If the instruction is generated from source code, then the debugger can determine, with greater certainty, that the branch instruction will be used for a function call. By restricting a debugger's treatment of perceived function calls to only those branches that are both used for function calls and have been generated from source code, a debugger may more accurately classify and handle a branch instruction in a step over operation, and may also be able to use the stack depth to ensure stopping at the return of the called instance of the routine since the stack depth is always defined within generated code.

FIG. 2 is a flowchart of a method to evaluate a branch instruction during a step over operation, according to embodiments of the invention. A user may invoke a step over command for a branch instruction using a debugger, as in 201. The debugger may determine whether the instruction may be used for a function call, as in 202. If the branch instruction is not used in a function call, the debugger treats the instruction as a branch that is not a function call, as in 203. If the branch instruction may be used in a function call, the debugger determines whether the instruction was generated from source code, as in 204. If the instruction was not generated from source code, the debugger treats the instruction as a branch that is not a function call, as in 203. If the instruction was generated from source code, the debugger treats the instruction as a function call, as in 205.

Step Over Operation Using Debug Information

According to embodiments of the invention, a debugger may determine whether an instruction has been generated from source code by utilizing debug information that includes relational information of machine instructions and source code. When a compiler creates an executable program, it may generate debug information used to later debug the program. This debug information may include source line mapping, symbol tables, and other source information that relates to machine instructions generated by the compiler. Source line mapping maps machine instructions to particular lines of source code from which they are generated. For example, in FIG. 1, the first jump instruction 101 used to call the function has been generated from line 7 of the source code. However, the second jump instruction 102 is generated as part of the architecture's calling convention, and does not map to a line of source code. Debug information may follow a debug data standard, such as DWARF, which uses debug information entries and line number tables to map machine instructions to a program's source code, prolog, and epilog.

Figure 3:
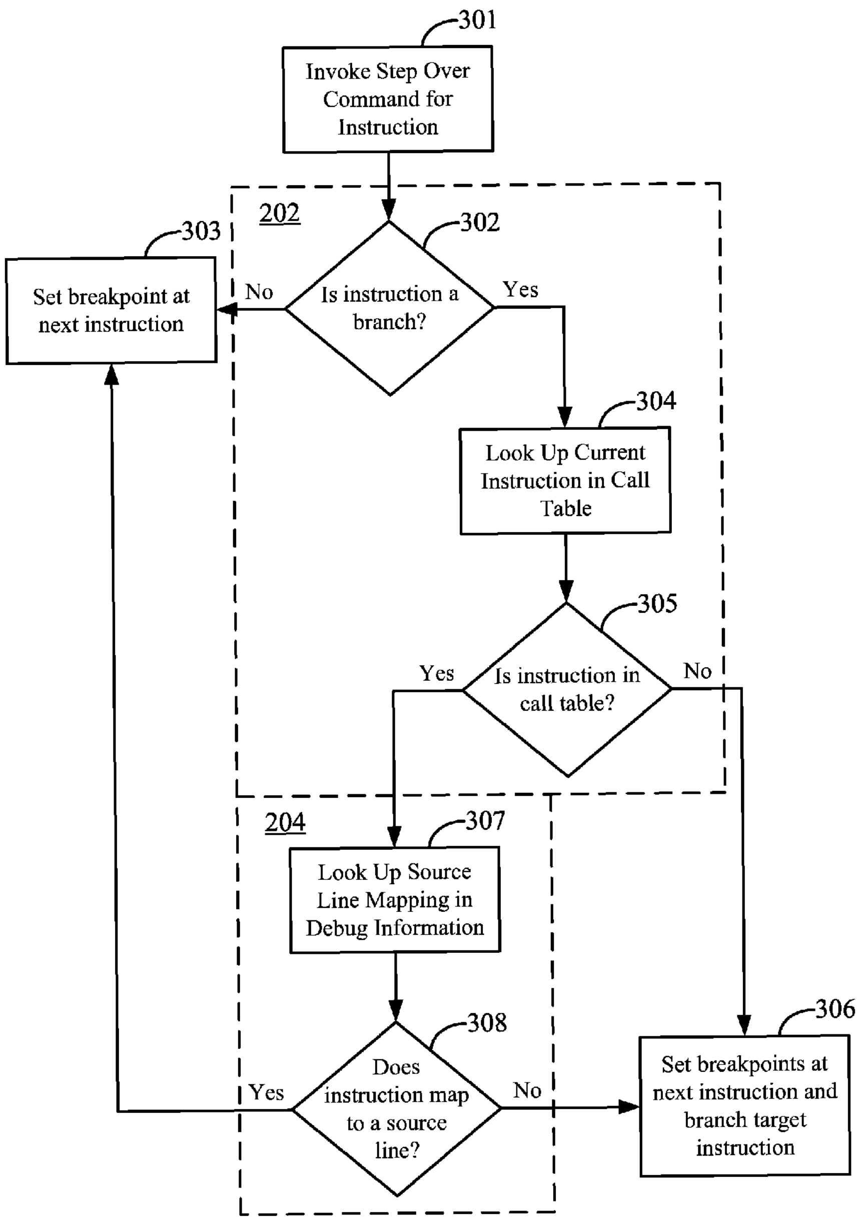
FIG. 3 is a flowchart of a method to evaluate an instruction during a step over operation at the machine code level utilizing a call table and debug information, according to embodiments of the invention.

FIG. 3 is a flowchart of a method to evaluate an instruction during a step over operation at the machine code level that utilizes a call table and debug information, according to embodiments of the invention. A user may invoke a step over command for an instruction in a current routine, as in 301. In identifying whether the instruction is a branch used as a function call, as in 202, the debugger may determine whether the instruction is a branch instruction, as in 302. For example, the compiler may generate a branch table of branch instructions as part of the debug information, and the debugger may search the branch table for the instruction to determine if the instruction is a branch. If the instruction is not a branch instruction, the debugger may set a breakpoint at the next instruction in the current routine, as in 303.

If the debugger identifies the instruction as a branch instruction, the debugger may determine whether the instruction may be used as a function call. The debugger may look up the instruction in a call table that contains branch instructions that may be used for function calls, as in 304. The call table may be a table of instructions used to implement a call. The debugger may determine whether the instruction is present in the call table, as in 305. If the instruction is not present in the call table, the debugger may treat the instruction as a branch that is not a function call by setting a breakpoint at the next instruction in the routine (for if the branch is not taken) and setting a breakpoint at the branch target instruction (for if the branch is taken), as in 306.

If the instruction is present in the call table, the debugger may determine whether the instruction has been generated from source code, as in 204. The debugger may look up the source line mapping of the instruction in the debug information generated by the compiler, as in 307, and determine whether the instruction maps to a line of source code, as in 308. The source code mapping may be present in the debug information as a debug information entry, following a debug information format such as DWARF.

If the debugger determines that the instruction does not map to a line of source code, the debugger may treat the instruction as a branch that is not a function call by setting a breakpoint at the next instruction and setting a breakpoint at the branch target instruction, as in 306. If the debugger determines that the instruction does map to a line of source code, the debugger treats the instruction as a function call by setting a breakpoint only at the next instruction. In the FIG. 1 example above, the debugger may determine that the first jump instruction 101 is a function call, and set a breakpoint on the next instruction. On the other hand, the debugger may determine that the second jump instruction 102 is not a function call, and set a breakpoint on the target instruction as the next instruction.

Recursive Routines

According to embodiments of the invention, a debugger that utilizes debug information to evaluate function calls may support recursive routines in programs using software stacks. Because debug information is known for an instruction used for a function call, debug information for that instruction may be accessed to determine the stack depth when the breakpoint for the step over operation is set. By saving a starting stack depth and evaluating an instruction with respect to the saved starting stack depth, the debugger may allow recursive routines in architectures that rely on software stacks, as the debugger may have call frame information to determine the stack depth.

Figure 4:
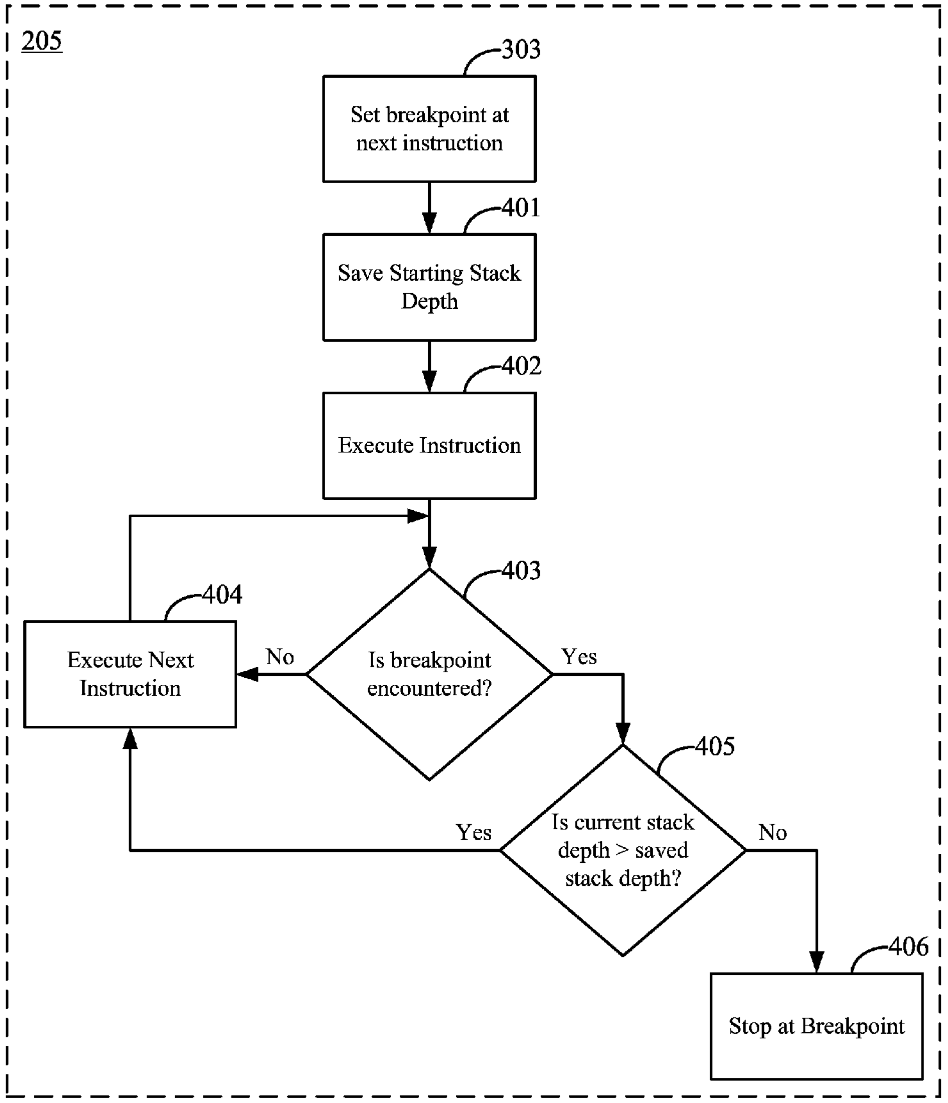
FIG. 4 is a flowchart for treatment of a function call in a program by a debugger for a step over operation, according to embodiments of the invention.

FIG. 4 is a flowchart of a method to step over a recursive routine with a step over operation, according to embodiments of the invention. Once it is determined from debug information that the instruction is a branch used for a function call, a breakpoint is set at the next instruction, as in 303. To set a reference for the routine in the call stack of the program, the debugger saves the call stack depth of the program at the beginning of the step over operation, as in 401.

After setting the breakpoint and saving the starting stack depth, the program executes, as in 402. The program continues to execute, as in 403 and 404, until a breakpoint is encountered. Once a breakpoint is encountered, the debugger determines whether the current stack depth is greater than the saved stack depth, as in 405. In stacks that populate from the top to the bottom, the debugger would evaluate whether the current stack is less than the saved stack depth. If the current stack depth is greater than the saved stack depth, the program executes the next instruction, as in 404, and continues to run. If the current stack depth is not greater than the saved stack depth, then the program stops at the breakpoint, as in 406.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer-implemented method for implementing a step over command by a debugger for a machine code instruction in a routine, comprising:

receiving a step over command for a machine code instruction;

determining whether the machine code instruction is a branch used for a function call;

in response to determining that the machine code instruction is not a branch used for a function call, setting a first breakpoint at a next machine code instruction in the routine and setting a second breakpoint at a target machine code instruction of the branch;

in response to determining that the machine code instruction is a branch used for a function call, determining whether the machine code instruction is generated from source code;

in response to determining that the machine code instruction is a branch used for a function call and is not generated from source code, setting the first breakpoint at a next machine code instruction in the routine and setting a second breakpoint at a target machine code instruction of the branch; and in response to determining that the machine code instruction is a branch used for a function call and is generated from source code, setting the first breakpoint at the next machine code instruction of the routine.

2. The method of claim 1, wherein the determining of whether the machine code instruction is a branch used for a function call further comprises:

determining whether the machine code instruction is a branch; and in response to determining that the machine code instruction is not a branch, setting a first breakpoint at a next machine code instruction in the routine.

3. The method of claim 2, wherein the determining of whether the machine code instruction is a branch used for a function call and the determining of whether the instruction is a branch further comprise:

in response to determining that the machine code instruction is a branch, determining whether the machine code instruction is a branch used for a function call by:

accessing a call table of instructions used for function calls;

determining whether the machine code instruction is present in the call table;

in response to determining that if the machine code instruction is not present in the call table, determining that the machine code instruction is a branch not used for a call function; and in response to determining that if the machine code instruction is present in the call table, determining that the machine code instruction is a branch used for a function call.

4. The method of claim 1, wherein the determining of whether the machine code instruction is generated from source code comprises:

accessing source line mapping in debug information created by a compiler;

determining whether the machine code instruction maps to a statement of source code using the debug information;

in response to determining that the machine code instruction does not map to a statement of source code, determining that the machine code instruction is not generated from source code; and in response to determining that the machine code instruction maps to a line of source code, determining that the instruction is generated from source code.

5. The method of claim 1, wherein the determining that the machine code instruction is a branch used for a function call, the determining that the machine code instruction is generated from source code, and the setting the first breakpoint at the next machine code instruction of the routine further comprises:

saving a starting stack depth;

executing the routine until a next breakpoint is encountered;

determining whether a current stack depth is greater than the starting stack depth when the next breakpoint is encountered; and stopping at the next breakpoint when the current stack depth is not greater than the starting stack depth.

6. The method of claim 1, wherein the machine code instruction is from an IBM z architecture instruction set.

7. The method of claim 4, wherein the debug information is in DWARF format.

8. The method of claim 1, wherein the debugger is dbx.

* * * * *